Figure 1:
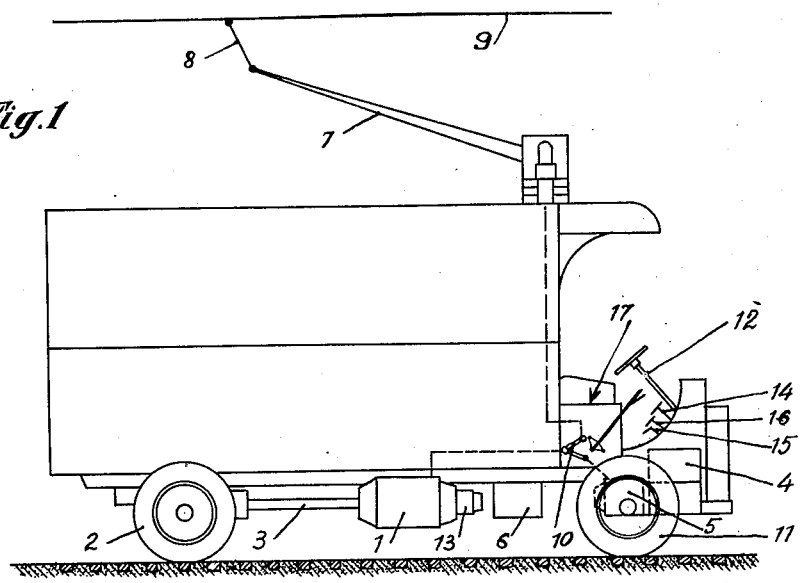

May 24, 1932.　　　　R. ROUGÉ　　　　1,859,343

ELECTRIC TRACTION SYSTEM

Filed June 24, 1931　　2 Sheets-Sheet 1

INVENTOR.
RAYMOND ROUGÉ
by
ATTORNEY.

May 24, 1932.   R. ROUGÉ   1,859,343
ELECTRIC TRACTION SYSTEM
Filed June 24, 1931   2 Sheets-Sheet 2
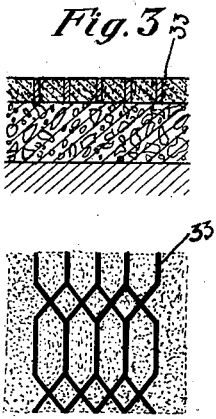
Fig. 3
Fig. 4
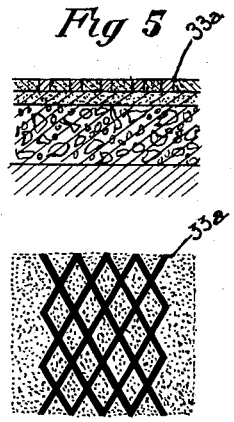
Fig. 5
Fig. 6
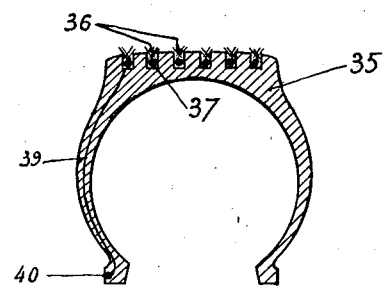
Fig. 7
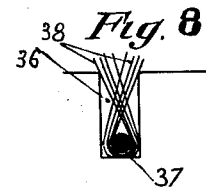
Fig. 8
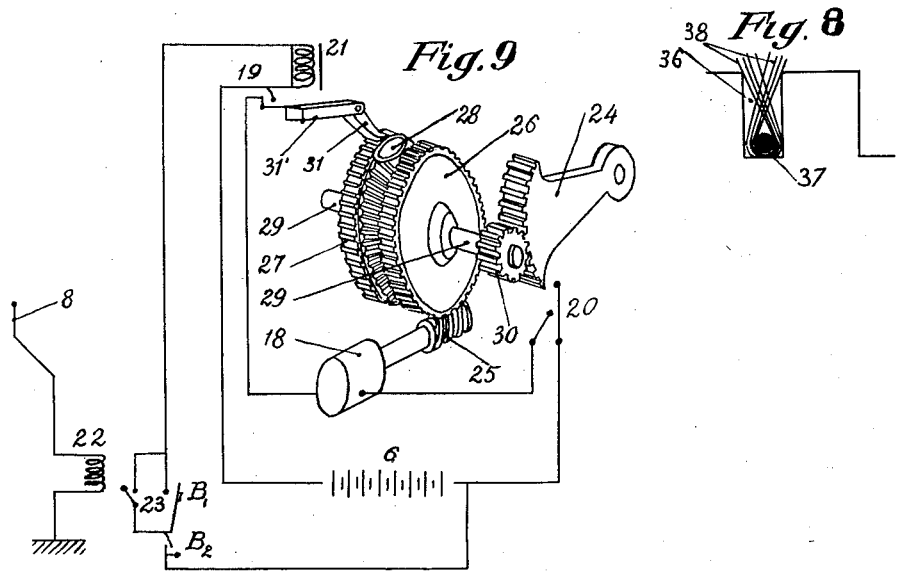
Fig. 9
INVENTOR.
RAYMOND ROUGÉ
by
ATTORNEY.

Patented May 24, 1932

1,859,343

UNITED STATES PATENT OFFICE

RAYMOND ROUGÉ, OF PARIS, FRANCE

ELECTRIC TRACTION SYSTEM

Application filed June 24, 1931, Serial No. 546,534, and in France June 25, 1930.

Vehicles adapted for electric traction are already known which are supplied with current by a combination arrangement, that is, by means of a line with which the vehicle is constantly in contact, and on the other hand, when the vehicle becomes separated from the line, by a storage battery enabling the vehicle to travel by its own means. In these known arrangements, whether the line is single-pole or double-pole, the vehicle when in contact with the line is obliged to follow a path determined in advance, for instance a track with rails, and thus when the vehicle passes around another vehicle or crosses the road, it must proceed upon the track in all cases.

The present invention relates to a system of electrified road, in combination with an electrically-operated vehicle having a combined current supply, in such manner that when the current of the line is employed, the vehicle travels on the road under the same conditions as prevail for self-contained vehicles, thus providing for the crossing of the road and for the passing of vehicles around one another, for side travel, etc., with return of the current through the ground. According to the invention, the overhead line is of the single-pole type, but it has a multiple construction, and thus consists of several wires in parallel position and spaced apart in such manner that a vehicle having the usual sliding trolley will remain in contact with at least one of the said wires irrespectively of its lateral position on the road, and the road itself is provided with a set of conductors embedded in the surface coating, and flush with the surface, this set having a sufficient width to enable the vehicle to remain constantly in contact with the same by at least one of its wheels, in all conditions of the normal traffic, including crossing and passing around vehicles of any kind, and even vehicles of the system according to the invention. The vehicle itself, of the self-propelled type, provided with the usual steering gear and with wheels having elastic tires, should contain a device by which the current will return to the conducting arrangement situated in the road, by means of its pneumatic or other usual elastic tires. The auxiliary plan for the supply of the motors on the vehicle will preferably consist of an electric generating set adapted for a long current supply, thus enabling the said vehicles to proceed from a specially equipped section of the road to an ordinary section of the road.

Figure 2:
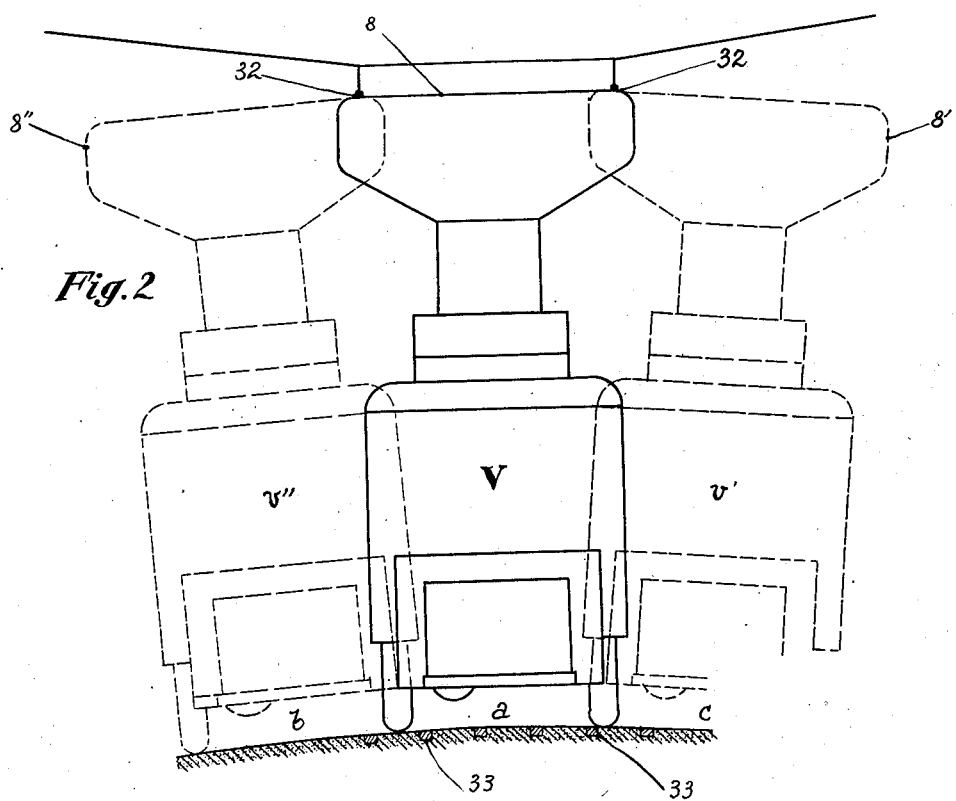

The accompanying drawings show by way of example various embodiments of the invention:

Fig. 1 is a diagrammatic side view of a vehicle equipped in conformity to the invention. Fig. 2 is a corresponding end view, showing that the vehicles can travel in various positions upon the width of the road, in order that the vehicles may cross the road or pass around one another. Figs. 3, 4, 5 and 6 are vertical cross sections and plan views, in pairs, showing various forms of road construction employing conducting bands which are flush with the ground. Figs. 7 and 8 relate to the construction of a pneumatic tire by which the carrying wheels of a vehicle will serve for the return of the current. Fig. 9 shows a device for the distant control of the sliding trolley, whereby it may be automatically lowered when the circuit is broken between the overhead line and the return conductor.

The vehicle shown in Fig. 1 essentially comprises: one or more electric motors 1 adapted to actuate the driving wheels 2 of the vehicle by means of suitable gear 3; a self-contained source of power such as an internal combustion engine 4 drives an electric generator 5 which is so arranged and connected as to supply current to the motor 1; a trolley device comprising an arm 7 supporting a sliding trolley 8 cooperating with an overhead line 9 for the supply of current to the said motor 1; a switching device 10 under the driver's control by which the current can be supplied by the overhead line or by the generator 5, or inversely; means for the return of the return of the current, and herein the said means consist of the pneumatic tires of the vehicle, which have a special construction, as will be further disclosed; means for the control for the steering wheels 11, such as the usual steering wheel 12 employed upon motor vehicles.

A storage battery 6 provides for the lighting of the vehicle, and for the starting of the internal combustion engine 4 by means of an electric starter, and if necessary, for the ignition of the engine. An electric generator 13 is mounted upon the shaft of the driving electric motor 1; it is connected with the said battery 6 and serves to charge the battery automatically when on the road.

Obviously, the vehicle further comprises various devices such as are usually employed upon motor vehicles: a brake pedal 14, an accelerator pedal 15 controlling the admission of fuel to the engine 4, as well as various devices in common use upon vehicles of the electric type, such as a pedal 16 controlling the starting rheostat of the motor 1, and a controller 17 by which the circuits of the said motor can be combined in order to obtain the different speeds.

The said accelerating pedal is preferably coupled to the engine accelerator and also to the devices for regulating the field of the electric motor 1, and thus the control for the acceleration will be the same whether the power is supplied by the line 9 or by the engine 4.

According to the invention, the road is arranged, as shown chiefly in Figures 1 and 2, in such manner that the vehicles may cross the road or pass around one another as if they were quite indepedent, and thus the vehicles may occupy any position across the road while remaining in contact with the overhead line and with the conducting devices provided on the ground. For this purpose, the line is of the single-pole type, but it comprises a plurality of parallel wires mounted above the road, for instance two wires 32—32 so spaced that a vehicle V having a sliding trolley 8 (or the like) will be in contact with at least one of these two wires for all positions between the extreme positions $v'$ and $v''$ as shown by the dot-and-dash lines in the figures. For the return of the current through the ground, the road is provided with a conducting arrangement such that at least one of the vehicle wheels will always be in contact with one of the conductors on the ground, whatever its position on the road.

The arrangement on the ground may consist of light metallic devices such as flat iron bars 33 (Figs. 3 and 4) which are mounted edgewise and are connected together in places, said bars being embedded in the surface covering of the road whether of cement or of a material containing a bituminous binding substance, or they may consist more simply of a metallic trelliswork 33, (Figs. 5 and 6) which is laid upon the asphalt facing of the road and is then pressed into the same in order that it will be embedded and will be flush with the top surface, and in fact, it will be maintained in this position by the travel of the vehicles over the road. This device is inexpensive and will not occasion any marked irregularities in the road, while obviating all disadvantages due to the slipping of vehicles upon smooth metallic surfaces. However, the return of the current might be assured by the use of parallel longitudinal metallic bands flush with the road surface. If the return of the current takes place through the tire itself, as will be further disclosed, and if such tires have a sufficient width and are used in pairs, the vehicle may move from one contact position to another, in practice, with a very short interruption of the current.

The contact between the metal of the vehicle and the conducting devices on the road adapted for the return of the current, can take place by various means such as special rollers pressed by springs upon the ground, but one feature of the invention consists in the use of the vehicle wheels themselves for this purpose, and thus their usual elastic or pneumatic tires are so arranged that their tread will be provided with metallic conducting parts which are connected with the motor 1 through the metal of the vehicle. Due to the elasticity of the tire, a good contact is assured upon the whole width of the tire, in spite of the irregularities of the road.

Figs. 7 and 8 show diagrammatically and by way of example, a pneumatic tire constructed in conformity to the invention. The part 35 of the tire, which has a relatively wide and flat cross section, comprises annular or crossed grooves 36 in which are laid conducting wires or cables 37 which serve to connect together and to maintain the conducting brushes 38 consisting of sets of fine and flexible wires which are flush with the tread of the tire. The said brushes will thus make contact with the conducting bands laid in the road, and they are connected, by the said supporting wires 37 and by transverse and radial members 39 embedded in the rubber and spaced apart on the periphery of the wheel, with conducting members 40 which are mounted in the beading of the tire, and make connection with the metallic parts of the wheel, which latter is in turn in contact with the metal of the vehicle.

In order to facilitate the operation of the devices the invention comprises means for the distant control, from the driver's seat, of the raising and lowering of the trolley arm 7, in order that one operating system may be instantly substituted for the other, and without stopping the vehicle. The trolley is preferably controlled by an electric motor 18 which may be set in operation by the driver by the use of a button within his reach. Furthermore, the device for controlling the trolley may be such that in the case of an excessive voltage between the overhead line and the return circuit, the trolley will be automatically lowered by its mechanism.

Fig. 9 shows such an arrangement, by way of example. The electric motor 18 employed to raise the trolley is supplied by a storage battery, for instance the battery 6, by means of a circuit-closing contact 19 and a circuit-breaking contact 20. An electro-magnet 21 controlling the closing of the contact 19 is connected with the terminals of the battery 6 by means of a switch button $B_2$ which is normally closed, and by a like button $B_1$ which is normally open; an electromagnet 22 is connected between the trolley and the parts used for the current return, and when energized it closes a switch 23 which is shunted upon $B_1$. The arm 7 of the trolley 8 is operated by a toothed sector 24 which is actuated by the electric motor 18 by means of the following device. The shaft of the motor carries an irreversible worm 25 in gear engagement with one of the wheels 26, of a pair of wheels 26—27 of a differential whose planetary pinion or pinions are shown at 28; the two wheels 26—27 are loose on the shaft 29, and the planetary pinion carrier 28 is secured to the shaft 29 to which is keyed a pinion 30 cooperating with the toothed sector 24. The periphery of the wheel 27 is toothed, and a pawl 31 mounted on the armature 31' of the electromagnet 21 may engage the teeth in order to hold the wheel 27 against all back motion.

The operation is as follows. The button $B_2$ being closed and thus in its normal position, the driver pushes the button $B_1$, and thus the circuit of the battery 6 is closed upon the electromagnet 21; the armature 31' is attracted, and the pawl 31 is thus engaged with the wheel 27 and thus holds it against back return, while at the same time the switch 19 is closed, thus supplying current from the battery to the motor 18 through the switch 20 which is normally closed. When the motor 18 is operated, this rotates the wheel of the differential 26, and as the wheel 27 is held fast, the planetary pinions 28 are rotated about the axis of the shaft 29 and thus rotate this shaft, thereby driving the pinion 30 and the toothed sector 25. The trolley arm 7 is thus raised, and the trolley 8 makes contact with the overhead line 9 situated above it. The driver can now release the button $B_1$, which again opens; the electromagnet 22 has been energized and thus remains, and it continues to close (at 23) the energizing circuit of the electromagnet 21. When the trolley reaches its maximum height, the toothed sector 24 has now made contact with the movable part of the switch 20 and the switch is opened, thus breaking the circuit of the motor 18.

As the wheel 27 is held by its pawl 21 and the wheel 26 is held by the engagement of said worm 25, the set of planetary pinions 28 is maintained in position and the trolley arm 7 is thus held in the raised position. If the driver desires to lower the trolley, he presses the button $B_2$, thus opening the circuit; the electromagnet is no longer energized, so that the pawl 31 releases the wheel 27 and allows it to turn loose on its shaft 29; since the planetary set 28 can now rotate about the axis of the shaft 29, the trolley arm will then descend by its own weight or by means of a spring. The apparatus will operate in the same manner if the current of the line should fail for any reason, for in this case the switch 23 would open.

The button $B_2$ for lowering the trolley is preferably combined with the switch of the starter used with the engine 4, and thus the driver need only push this button $B_2$ in order to lower the trolley and to start the engine at the same time.

The general use of the apparatus and the handling of a vehicle, according to the invention, will now be readily understood.

When on the ordinary road, with the trolley lowered, and the electric generating set now operating, the vehicle comes into the proper position on the electrically equipped road, the driver simply raises the trolley by pressing the button $B_1$. When the trolley is in contact with the line, the electric generating set then stops, and the motors are now supplied, without any interruption, by the overhead line.

When crossing the road, or passing around other vehicles, which may temporarily break the contact between the wheels and the conducting bands on the road, the driver can hold the trolley in the raised position by pressing the button. In all other cases, when the contact with the overhead line or with the ground plates is broken, this lowers the trolley. The driver can then use his discretion, according to circumstances, to raise the trolley if he is in the proper position on the road, or to start the electric generating set in order that the vehicle may travel by its own means, and this latter operation will be most useful for clearing an encumbered part of the road, or a part on which the overhead line is interrupted for any reason.

When the driver desires to leave the electrified road, he simply presses the button for starting the electric generating set, thus lowering the trolley and supplying the motors by the means on board, and the vehicle may thus continue to travel without any interruption.

Claims:

1. A system of traction upon roads by the use of a self-propelled vehicle provided with steering gear and with wheels having elastic tires, and driven by an electric motor supplied at will by an outside line or by a self-contained source of power, comprising, in combination: a single-pole overhead trolley line having a plurality of spaced wires; conducting means provided on the ground of the road on a region wider than the wheel gauge of the vehicle; and a vehicle provided with a sliding trolley and with means for the return of the current to the road through the elastic tires of the wheels.

2. A system of traction upon roads by the use of a self-propelled vehicle provided with steering gear and with wheels having elastic tires, and driven by an electric motor supplied at will by an outside line or by a self-contained source of power, comprising, in combination a single-pole; conducting means provided on the ground of the road on a region wider than the wheel-gauge of the vehicle, said means consisting of a set of metallic elements connected together and embedded in the surface covering of the road, and flush with the surface at least in part, and a vehicle provided with a sliding overhead trolley and with means for the return of the current through the elastic tires of the wheels.

3. A system of traction upon roads by the use of a self-propelled vehicle provided with steering gear and with wheels having elastic tires, and driven by an electric motor supplied at will by an outside line or by a self-contained source of power, comprising in combination: a single-pole overhead trolley line having a plurality of spaced wires; conducting means provided on the ground on a region wider than the wheel-gauge of the vehicle; and a vehicle provided with a sliding trolley and with means for the return of the current to the road, consisting of conducting elements which are flush with the tread surface of the wheel tires, and are conductively connected by the wheel rim with the metal parts of the vehicle.

4. A system of traction upon roads by the use of a self-propelled vehicle provided with steering gear and with wheels having elastic tires, and driven by an electric motor supplied at will by an outside line or by a self-contained source of power, comprising, in combination: a single-pole overhead trolley line having a plurality of spaced wires; conducting means provided on the ground of the road on a region wider than the wheel-gauge of the vehicle and a vehicle provided with a sliding trolley and with means for the return of the current to the road through the elastic tires of the wheels with an electric generating set, and with means for simultaneously starting the said generating set and for lowering the said trolley, and inversely.

In testimony whereof I have signed this specification.

RAYMOND ROUGÉ.